(12) United States Patent
Yagi (10) Patent No.: US 7,155,567 B2
(45) Date of Patent: Dec. 26, 2006

(54) CONTROL METHOD FOR DATA TRANSFER DEVICE, DATA TRANSFER CIRCUIT, AND DISK ARRAY DEVICE

(75) Inventor: Satoshi Yagi, Oi (JP)

(73) Assignee: Hitachi, Ltd., Tokyo (JP)

( * ) Notice: Subject to any disclaimer, the term of this patent is extended or adjusted under 35 U.S.C. 154(b) by 107 days.

(21) Appl. No.: 10/795,996

(22) Filed: Mar. 10, 2004

(65) Prior Publication Data
US 2005/0055522 A1 Mar. 10, 2005

(30) Foreign Application Priority Data
Sep. 5, 2003 (JP) .............................. 2003-314010

(51) Int. Cl.
*G06F 12/00* (2006.01)
*H03M 13/09* (2006.01)
(52) U.S. Cl. ..................................... 711/113
(58) Field of Classification Search ................ 711/114, 711/113; 714/6
See application file for complete search history.

(56) References Cited

U.S. PATENT DOCUMENTS

| | | | | |
|---|---|---|---|---|
| 5,497,457 | A * | 3/1996 | Ford ............................ | 714/6 |
| 5,586,302 | A | 12/1996 | Keener et al. | |
| 5,721,949 | A | 2/1998 | Smith et al. | |
| 5,737,633 | A | 4/1998 | Suzuki | |
| 5,832,310 | A | 11/1998 | Morrissey et al. | |
| 6,202,124 | B1 | 3/2001 | Kern et al. | |
| 6,438,660 | B1 * | 8/2002 | Reams ........................ | 711/143 |
| 6,463,501 | B1 * | 10/2002 | Kern et al. ................. | 711/100 |
| 6,636,933 | B1 * | 10/2003 | MacLellan et al. ......... | 710/317 |
| 6,694,386 | B1 | 2/2004 | Arase et al. | |
| 6,842,825 | B1 * | 1/2005 | Geiner et al. ............... | 711/133 |
| 2003/0093625 | A1 * | 5/2003 | Beukema et al. ........... | 711/147 |
| 2003/0115437 | A1 * | 6/2003 | Tomita ........................ | 711/203 |
| 2004/0210712 | A1 * | 10/2004 | Katsuragi et al. ........... | 711/112 |

FOREIGN PATENT DOCUMENTS

JP 6-175787 6/1994

* cited by examiner

*Primary Examiner*—Matthew Kim
*Assistant Examiner*—Shane M. Thomas
(74) *Attorney, Agent, or Firm*—Mattingly, Stanger, Malur & Brundidge, P.C.

(57) ABSTRACT

A data transfer device has a data receiver, a data control unit, and a data storage unit. In a control method for the data transfer device, the data control unit reads serial data from the storage device in block units and stores this serial data in the data storage unit. When a block constituting the write destination of the write data and a block stored in the data storage unit differ, the data control unit generates a security code, based on the serial data stored in the data storage unit, and adds the generated security code to the serial data before transferring this serial data to the storage device. The data control unit reads the serial data in the block constituting the write destination of the write data, before storing this serial data in the data storage unit, and updates the stored serial data by means of the write data.

12 Claims, 9 Drawing Sheets

CONTROL METHOD FOR DATA TRANSFER DEVICE, DATA TRANSFER CIRCUIT, AND DISK ARRAY DEVICE

CROSS-REFERENCES TO RELATED APPLICATIONS

This application relates to and claims priority from Japanese Patent Application No. 2003-314010, filed on Sep. 5, 2003, the entire disclosure of which is incorporated herein by reference.

BACKGROUND OF THE INVENTION

The present invention relates to a control method for controlling a data transfer device, a data transfer circuit, and a disk array device.

The content of data handled by the information processing systems of recent years has become more and more important, which has in turn established a need for the reliability of storage devices. In a known method for increasing the reliability of storage devices, a security code, such as an LRC (Longitudinal Redundancy Check) code, is added to data that is stored in a storage device, such as a hard disk. Data handling between a storage device and an information processing device is performed in block units, and the security code is also added in block units.

Therefore, the methods for connecting to a storage device have diversified in recent years, and the adoption of technologies for linking information processing devices and storage devices by means of networks, as in the case of Fibre Channels, an iSCSI (Internet SCSI), and so forth, has begun. In an environment where information processing devices and storage devices are connected by a network, the information processing devices and storage devices are connected by a plurality of channels, and blocks of data transmitted from an information processing device to a storage device are sometimes transmitted on the network in different data-block sizes. For this reason, a situation may arise where only a portion of a block transmitted from the information processing device reaches the storage device. Further, there may also be transmissions in which a portion of a certain block and a portion of a block that is different from this block are mixed. Thus, a situation may arise where the storage device is unable to receive data blocks as serial data in the order in which this data is written to successive areas of the storage device.

However, in the case of conventional storage devices, there is the premise that at least one block's worth of data will be serially transmitted in the order of addresses stored in the storage device, which is not reconcilable with a situation where only a portion of a block is transmitted, as in the case of the network-connected embodiment referred to above.

SUMMARY OF THE INVENTION

The present invention was conceived in view of this situation, an object thereof being to provide a control method for a data transfer device that computes, in block units, a security code for data blocks stored by a storage device, as well as a data transfer circuit and disk array device.

The main aspect of the present invention that achieves the above object is a control method for a data transfer device that comprises: a data receiver for receiving write data for a storage device; a data control unit for transferring the write data received by the data receiver to the storage device; and a data storage unit for storing serial data that is stored in a storage area of the storage device. The data control unit reads the serial data stored in the storage device in block units and stores this serial data in the data storage unit. When, with respect to the received write data, a block in the storage area of the storage device constituting the write destination of the write data and the block in the storage area of the storage device that is stored in the data storage unit are the same, the data control unit updates data stored in the data storage unit corresponding with the storage-device storage location constituting the write destination of the write data by means of the write data. However, with respect to the received write data, when a block in a storage area of the storage device constituting the write destination of the write data and the block in the storage area of the storage device that is stored in the data storage unit are different, the data control unit generates security code based on the serial data stored in the data storage unit, adds the generated security code to the serial data stored in the data storage unit before transferring this serial data to the storage device, reads the serial data stored in the block in the storage area of the storage device constituting the write destination of the write data before storing this serial data in the data storage unit, and updates the data stored in the data storage unit corresponding with the storage-device storage location constituting the write destination of the write data by means of the write data.

Here, the 'data transfer device' is a data controller 500 that comprises a disk array device 200, which will be described subsequently, for example. The 'storage device' is a cache memory 206, a disk drive 300, and so forth with which a disk array device 200 (described later) is equipped, for example. The 'security code' is an error detection code, such as LRC code, VRC code, CRC code, parity, checksum or Hamming code, or the like, for example. The data stored in the storage device is read in block units, and a security-code computation is performed on the serial data forming a block. By using the computed security code and security code that is added to the block units, an examination is made to determine whether there are no errors in the block-unit data. Therefore, data is stored in block units in the storage device, and a security code that is determined by means of a computation similar to that used during reading must be added to the serial data forming each block.

According to the present invention, the data control unit reads serial data stored in the storage device to the data storage unit, updates the serial data thus read by means of received write data, and then computes a security code based on the updated serial data. Therefore, the data control unit is able to compute the security code for the serial data stored in the data storage unit, according to the order of the storage locations stored in the storage device. Accordingly, even when the data receiver receives a plurality of write data items in a different order relative to the order of the storage locations in the storage device, the data control unit is able to compute the security code according to the order of the storage locations in the storage device based on the serial data stored in the data storage device. Further, even when the write data received by the data receiver is variable-length data forming only a portion of a block, because data is stored in block units in the data storage unit, the data control unit is able to compute the security code in block units. The data control unit suitably reads serial data of a block constituting a write target from the storage device. Hence, even in cases where the data receiver is unable to receive write data for the same block in series, the data control unit is able to add the security code in block units. The data control unit adds a security code, which is calculated based on serial data stored in a data storage device, to the serial data and then sends this data to the storage device, meaning that block-unit data to which a security code computed according to the storage-location order has been added, is continually stored in the storage device.

Further, other special characteristics of the present invention will become apparent from the following more detailed description and the attached drawings.

The present invention is capable of providing a control method for a data transfer device, a data transfer circuit, and a disk array device.

DESCRIPTION OF THE PREFERRED EMBODIMENTS

Embodiments of the present invention will be described in detail hereinbelow with reference to the drawings.

First Embodiment

Figure 1:
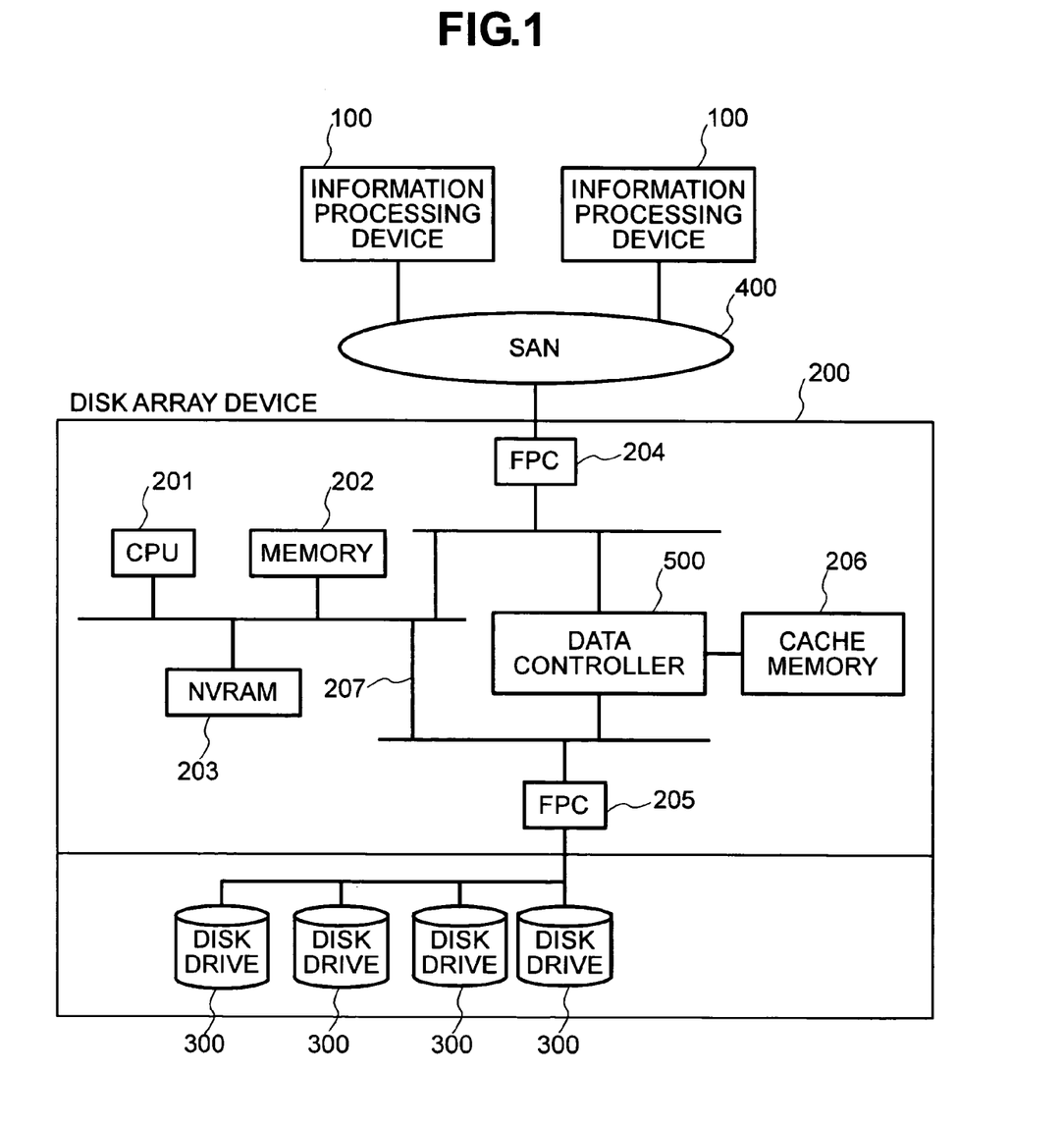
FIG. 1 is a block diagram showing the constitution of an information processing system comprising a disk array device that has the data transfer circuit according to an embodiment of the present invention.

FIG. 1 is a block diagram showing the constitution of an information processing system comprising a disk array device that has the data transfer circuit of this embodiment.

The 'data transfer circuit' is a data controller, which will be described later. The information processing system shown in FIG. 1 is constituted of an information processing device 100, which supplies a variety of information processing services, and a disk array device 200, that provides the information processing device 100 with a storage area in the form of the disk drive 300.

The information processing device 100 is a computer comprising a CPU (Central Processing Unit), memory, and so forth. The information processing device 100 implements a variety of functions as a result of various programs being run by the CPU that the information processing device 100 comprises. The information processing device 100 is a personal computer, work station, or mainframe computer, for example. The information processing device 100 may be a single computer or a plurality of computers. An operating system is run on the information processing device 100 and various application programs are run on the operating system.

The information processing device 100 is connected to a disk array device 200 via a SAN (Storage Area Network) 400. Communication between the information processing device 100 and disk array device 200 that take place via the SAN 400 are generally performed according to the Fibre Channel protocol, but the SAN 400 can be a communication channel according to a variety of protocols other than the Fibre Channel protocol. Examples of employable communication modes for connecting the information processing device 100 and disk array device 200 include a LAN (Local Area Network), SCSI (Small Computer System Interface), iSCSI (Internet Small Computer System Interface), ESCON (Enterprise System Connection) (registered trademark), FICON (Fibre Connection) (registered trademark), ACONARC (Advanced Connection Architecture) (registered trademark), and FIBARC (Fibre connection Architecture) (registered trademark). Further, a direction connection mode can also be used for the information processing device 100 and disk array device 200, instead of a network connection mode.

The information processing device 100 transmits a block-unit data I/O request (hereinafter called a 'block access request') to the disk array device 200 in accordance with the Fibre Channel protocol. Upon receiving the block access request from the information processing device 100, the disk array device 200 performs processing related to the input/output of data with respect to the disk drive 300 in accordance with the received block request. Thus, application programs that are run on the information processing device 100 execute various processings while suitably accessing storage areas of the disk drive 300.

The disk array device 200 comprises a multiplicity of physical disks (disk drives 300) and the storage areas of a plurality of disk drives 300 are supplied to the information processing device 100. A hard disk drive, flexible disk drive, semiconductor storage device, or the like, can be used as the disk drive 300, for example. The physical storage area supplied by the disk drives 300 is managed with logically set logical units as the units. An identifier, such as a Logical Unit Number (LUN), is assigned to each logical unit, and the data input/output to the disk drive 300 is performed by designating a logical unit number. The disk array device 200 manages data in block units, such as 512 bytes, for example, on logical units that are set in the disk drive 300. The disk array device 200 performs processing related to the input/output of data in these block units. Blocks in such units are known as 'logical blocks'. A Logical Block Address (LBA) indicating storage location information is assigned to each logical block, and a logical unit number and logical block address are designated for a block access request with respect to the disk array device 200 from the information processing device 100.

The disk array device 200 constitutes a disk array formed by a plurality of disk drives 300, and it is able to provide a storage area that is managed by RAID or a storage area managed by a single physical disk. The disk drive 300 may be integrated with the disk array device 200, or it may be a device separate from the disk array device 200 that is connected to the disk array device 200 by a communication channel, such as a SCSI, LAN, or a SAN.

Disk Array Device

The disk array device 200 comprises a CPU 201, a memory 202, NVRAM 203, FPC 204, FPC 205, cache memory 206, and a data controller 500, which are connected to one another via a bus 207. The bus 207 is a PCI bus that transmits data in 32-bit units, for example. The data units transmitted by the bus 207 are known as 'words'. Naturally, the bus 207 may be a bus other than a PCI bus. Further, one word is not limited to 32 bits, other possible units being 8-bit, 16-bit, 64-bit, or 128-bit units.

The CPU 201 exercises overall control of the disk array device 200 and is able to implement a variety of functions, such as management of the disk drive 300 and parsing of a block access request, and so forth, by running an application program stored in the memory 202, NVRAM 203, and so forth. The NVRAM 203 is nonvolatile memory, such as flash memory, for example, for storing a program executed by the CPU 201.

The FPC 204 is an interface for communicating with the information processing devices 100. The FPC 204 is also known as a 'host interface'. The FPC 204 comprises a function for receiving a block access request according to the Fibre Channel protocol. The FPC 204 is also able to accept a block access request of a protocol, such as iSCSI, for example, via the communication mode of the SAN 400.

The FPC 205 is an interface for data handling between the disk drives 300. The FPC 205 is also known as a disk interface. The FPC 205 has a function for transmitting a data I/O request with respect to the disk drives 300 according to a protocol that prescribes commands for controlling the disk drives 300, and so forth. The FPC 205 is able to transmit a data-write or -read command or other command with respect to the disk drive 300 in accordance with a protocol, such as SCSI or Fibre Channel, and so forth, for example.

The cache memory 206 is a memory for storing data that is sent and received between the FPC 204 and FPC 205.

The data controller 500 carries out data transfers between the FPC 204 and the cache memory 206, or the cache memory 206 and the FPC 205 under the control of the CPU 201. The data controller 500 can be a circuit that forms the logic in an IC for a specific application, for example.

When the information processing device 100 transmits a block access request, that requests writing to the disk drive 300 (called a 'block write request' hereinafter), to the disk array device 200, the FPC 204 in the disk array device 200 receives the block write request and the data controller 500 transfers block-unit write data, which pertains to the block write request, to the cache memory 206. When the write data is transferred to the cache memory 206, the data controller 500 reads the write data from the cache memory 206 to the FPC 205, and the FPC 205 then sends a command instructing writing in block units with respect to the disk drive 300.

Data controller

Figure 2:
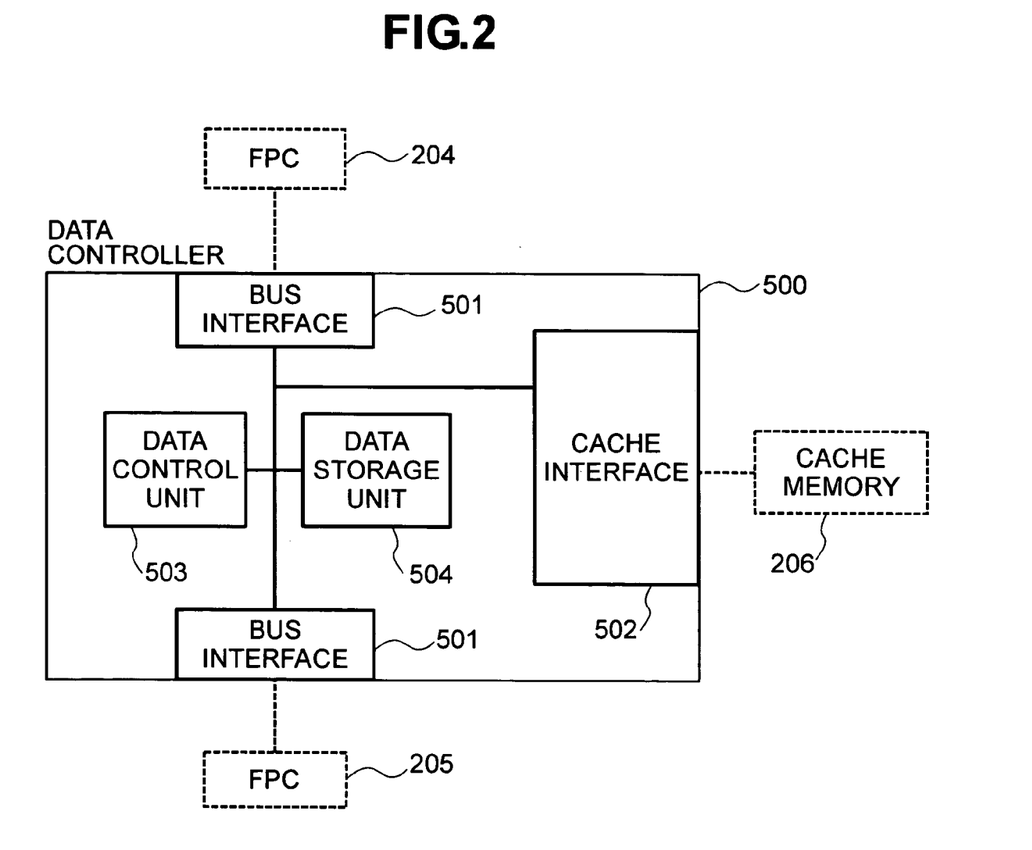
FIG. 2 is a block diagram of the data controller 500 comprising the disk array device 200 according to an embodiment of the present invention.

FIG. 2 is a block diagram of the data controller 500 that the disk array device 200 comprises. The data controller 500 comprises a bus interface 501, a cache interface 502, a data control unit 503, and a data storage unit 504.

The bus interface 501 is connected to the bus 207. The bus interface 501 functions as a data receiver and data transmitter for sending and receiving data between the FPC 204, FPC 205, and so forth, via the bus 207. Upon receiving data from the FPC 204 or FPC 205, the bus interface 501 tests the completeness of the received data by using parity that is added to the received data. Further, when sending data to the FPC 204 or FPC 205, the bus interface 501 sends this transmission data with parity added thereto.

The cache interface 502 is an interface that sends and receives data to and from the cache memory 206. The cache interface 502 functions as a data read unit that reads data from the cache memory 206 and a data write unit that writes data to the cache memory 206. The cache interface 502 computes and adds an ECC (Error Correcting Code) when data is written to the cache memory 206, and then tests the completeness of the data by means of the ECC when data is read from the cache memory 206.

The data control unit 503 has a function to transfer data between the FPC 204 or FPC 205, and the cache memory 206.

The data storage unit 504 is able to store data of a size equivalent to one block. Naturally, data equivalent to a plurality of blocks may be stored in the data storage unit 504. The data control unit 503 reads data from the disk drive 300 in single blocks and stores this data in the data storage unit 504. The data control unit 503 computes the security code by employing an XOR operation with respect to 32-bit data for the blocks of data stored in the data storage unit 504.

Data Transfer Processing in which Security Code is Added

In order to protect the integrity of data stored in the disk drive 300, the disk array device 200 performs management by adding a security code to each logical block constituting a unit for sending/writing data to the disk drive 300. The addition of the security code to a logical block is performed by the data controller 500. Further, a security code is assigned in the data transfer processing up until write data is written to the disk drive 300. The data transfer processing performed within the disk array device 200 will be described hereinbelow.

Figure 3:
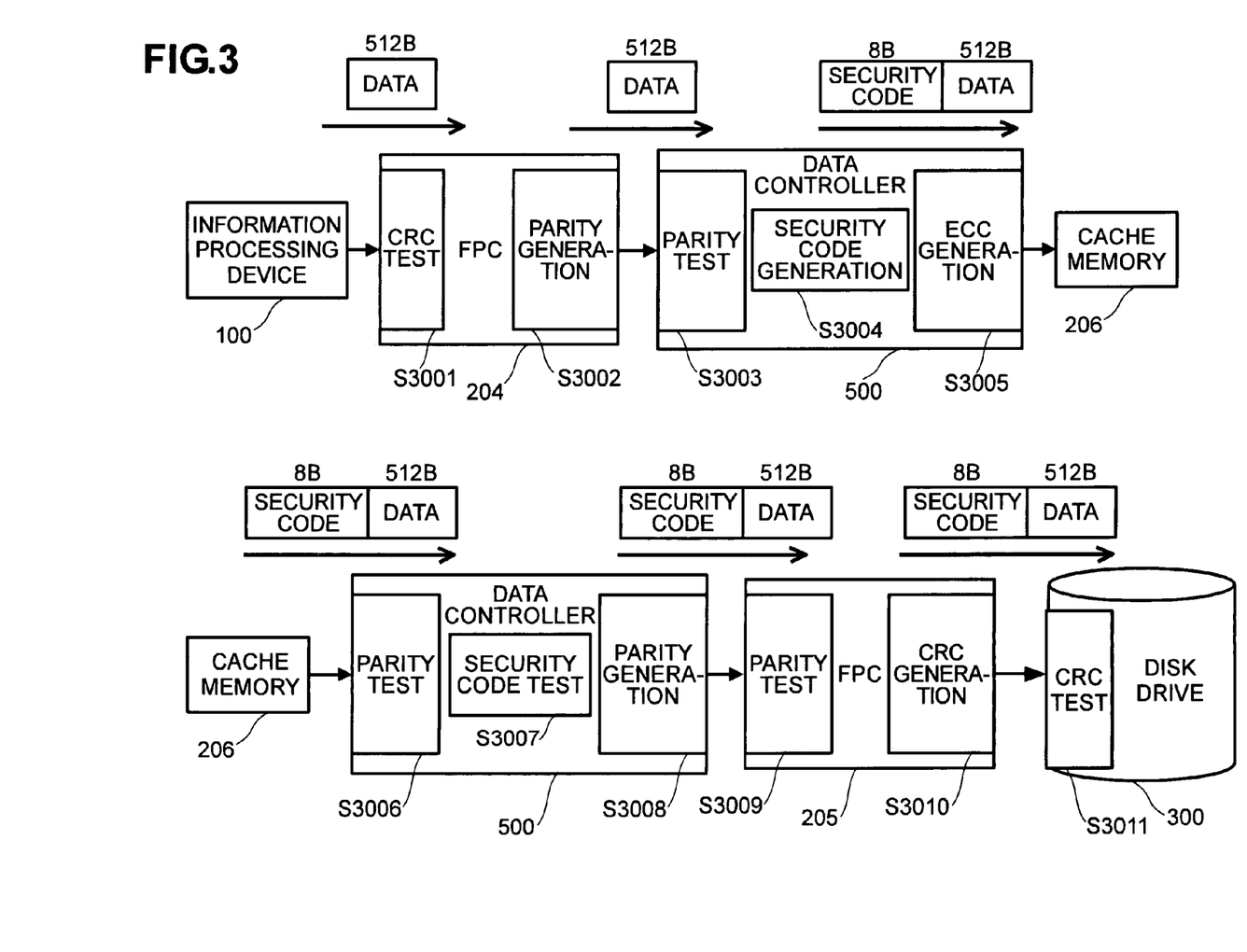
FIG. 3 is a diagram showing the processing flow up until a block write request is received from the information processing device 100 and then written to the disk drive 300, according to an embodiment of the present invention.

FIG. 3 is a diagram showing the processing flow up until a block write request is received from the information processing device 100 and then written to the disk drive 300. A block write request associated with a single block of write data is sent by the information processing device 100.

The FPC 204 receives the block write request from the information processing device. A CRC (Cyclic Redundancy Check) code is added to the block access request transmitted by the information processing device 100. The FPC 204 computes the CRC code for the write data associated with the block write request. The FPC 204 compares the computed CRC code and the CRC code added to the block access request to confirm that no errors exist in the write data (S3001). The FPC 204 computes parity for the write data and sends the write data to the data controller 500 with the parity added to the write data (S3002). Upon receiving the write data, the data controller 500 confirms that the received data is correct by using the parity added to the write data (S3003). The data controller 500 computes a LRC (Longitudinal Redundancy Check) code for the write data and adds this LRC code to the write data (S3004). The data controller 500 generates an ECC for the write data to which the LRC code has been added (S3005) and transfers the ECC to the cache memory 206 together with the write data to which the LRC code was added. In the serial processing up until this point, the disk array device 200 stores the write data for the disk drive 300 that is received from the information processing device 100 in the cache memory 206 with the LRC code added to this write data. When the disk array device 200 stores the write data in the cache memory 206, the fact that writing is complete is communicated to the information processing device 100.

Meanwhile, the disk array device 200 transfers the write data for the disk drive 300 stored in the cache memory 206 from the cache memory 206 to the disk drive 300 with a predetermined timing. The predetermined timing is determined, for example, on the basis of when a certain fixed period has elapsed, or when the free space in the cache memory 206 drops below a certain fixed amount, and so forth.

The CPU 201 runs the data controller 500 so that it processes a data transfer from the cache memory 206 to the FPC 205, and hence, the data transfer processing by the data controller 500 begins. The data controller 500 reads blocks of data from the cache memory 206 and confirms whether or not there are errors in the data read from the cache memory 206 by means of the ECC (S3006). The data controller 500 confirms that no errors exist in the write data by computing the LRC code for the write data and then comparing the LRC code added to the write data with the computed LRC code (S3007). The data controller 500 then transfers the write data to the FPC 205 by adding parity to the write data to which the LRC code has been added (S3008). Upon receiving this data, the FPC 205 confirms that no errors exist in the received data by using the parity added to this data (S3009). The FPC 205 computes the CRC code for the write data to which the LRC code was added, generates a block write request, and adds the computed CRC code to the block write request (S3010). The FPC 205 transmits a block write request associated with write data to the disk drive 300. The disk drive 300 then confirms that there are no errors in the write data by using the CRC code that was added to the block write request (S3011) and stores the data. Write data is stored in this disk drive 300 by adding the LRC code to the write data in block units.

When data reading takes place, a processing that is the reverse of the write processing is performed in the disk array device 200. The FPC 205 uses the CRC code to confirm that no errors exist in the blocks of data to which the LRC code has been added that are sent from the disk drive 300. The data controller 500 confirms that no errors exist in data received from the FPC 205 by means of parity. The data controller 500 confirms that no errors exist in the read data by computing the LRC code for the read data and then using the LRC code added to the read data. The data controller 500 adds the ECC and then writes the read data to which the LRC code was added to the cache memory 206. The data controller 500 then reads the read data with the added LRC code from the cache memory and confirms that no errors exist in the read data by means of the ECC. The data controller 500 confirms that there are no errors in the read data by means of the LRC code added to the read data. The FPC 204 tests for errors in the read data transferred from the data controller 500 by means of parity. The FPC 204 generates the CRC code for the read data and transmits the read data to the information processing device 100 in accordance with the Fibre Channel protocol. The information processing device 100 confirms that there are no errors in the read data by using the CRC code that is added to the received data.

Therefore, while the disk array device 200 detects errors in the transferred data by means of a CRC code, parity, ECC, and so forth, the data controller 500 performs data error detection that uses the LRC code added to the block-unit data. Therefore, the disk array device 200 is then able to provide a highly reliable data storage service.

Explanation of a Situation where Data is not Transmitted in Block Units

A plurality of information processing devices 100 are able to access a single disk array device by means of a protocol such as the Fibre Channel protocol or iSCSI protocol, and hence a situation where one block's worth of data does not arrive sequentially can arise. This situation will now be described with reference to FIGS. 4 and 5.

Figure 4:
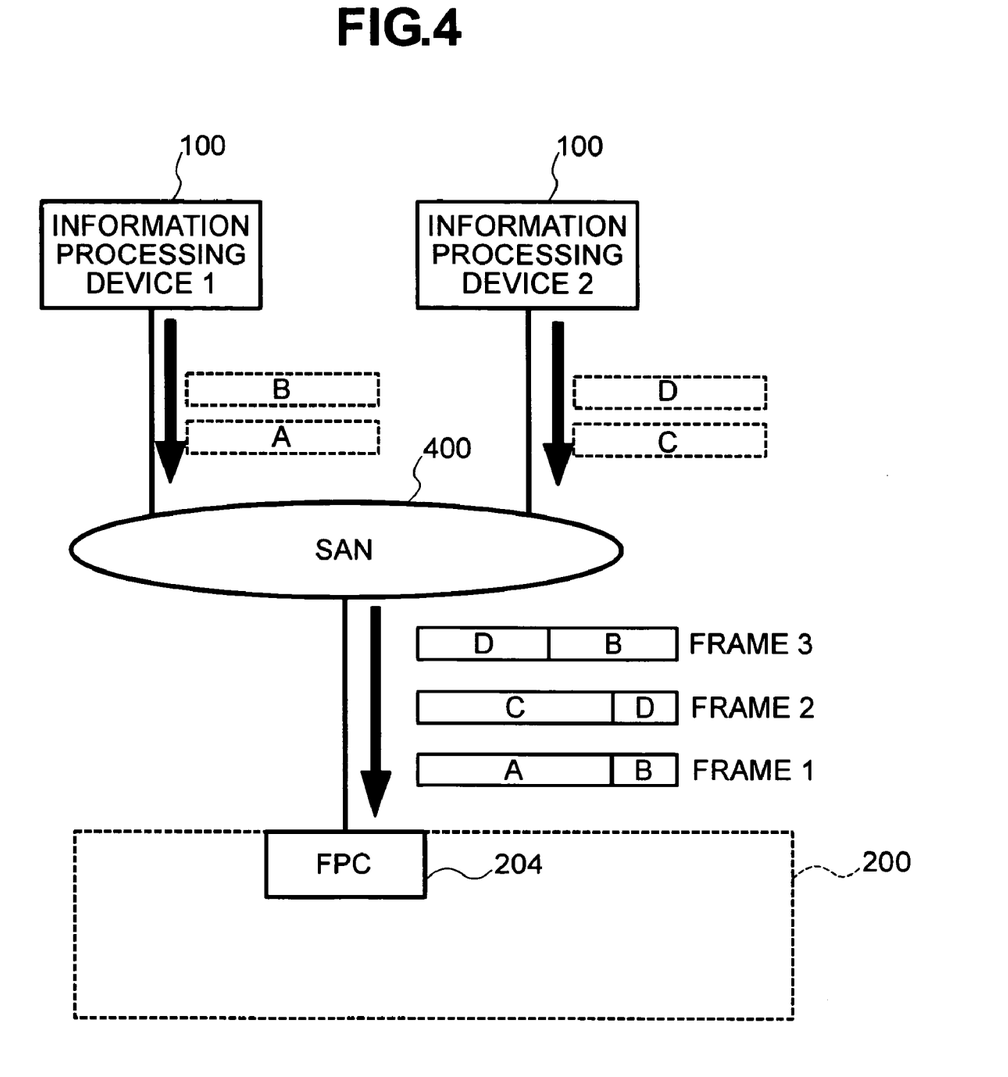
FIG. 4 is a schematic diagram showing a case where the frame size of the Fibre Channel protocol and the size of the blocks of data stored in the disk drive 300 are different, according to an embodiment of the present invention.

FIG. 4 is a diagram showing a case where the frame size of the Fibre Channel protocol and the size of the blocks of data stored in the disk drive 300 are different. The units of data (hereinafter referred to as 'frames') transmitted on the SAN 400 are larger in size than the logical blocks managed on the disk drives 300. Therefore, in a case where a plurality of frames are suitably mixed and transmitted by means of a switch or the like, write data with respect to a plurality of logical blocks are sometimes mixed with the frames transmitted on the SAN 400. FIG. 4 shows an aspect in which write data for a logical block A and write data for a logical block B are mixed in the same frame 1. Write data for the logical block A is completely contained in frame 1, but only a portion of the write data for logical block B is contained in frame 1. Therefore, even when the disk array device 200 receives the frame 1, the data controller 500 is unable to receive the data of the logical block B, which is write data to be transferred to the cache memory 206, in block units.

Figure 5:
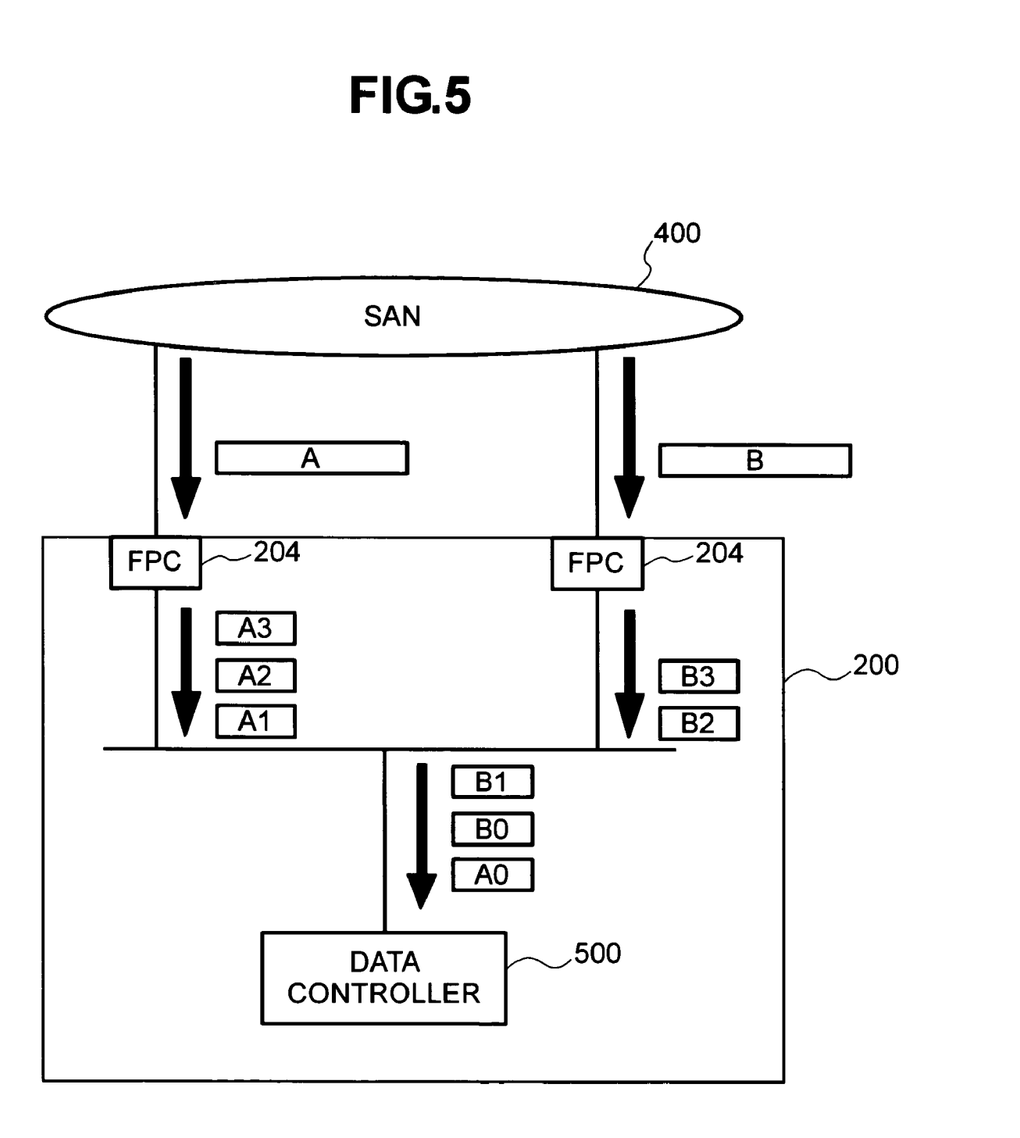
FIG. 5 is a diagram showing a state where the disk array device 200 comprises a plurality of FPC 204, and data for different logical blocks are mixed and transmitted as such to the data controller 500, according to an embodiment of the present invention.

Further, when, for example, the disk array device 200 comprises a plurality of FPC 204, in cases where this plurality of FPC 204 is constituted to transmit write data received via the same bus 207 to the data controller 500, the data controller 500 sometimes receives data in which the write data from the plurality of FPC 204 are mixed.

FIG. 5 is a diagram showing a state where the disk array device 200 comprises a plurality of FPC 204 and data for different logical blocks are mixed and transmitted as such to the data controller 500. When the FPC 1 (204) transmits data 'A0' and 'A1', and the FPC2 (204) transmits data 'B0' and data 'B1', the data on the bus 207 mix together, and, as shown in FIG. 5, write data sometimes also arrives in the data controller 500 in the order 'A0', 'B0', 'B1', and 'A1'.

Therefore, in cases where the disk array device 200 receives data for a logical block such that only a portion of the logical block is received, or where the information processing device 100 transmits variable-length data to the disk array device 200, and so forth, the disk array device 200 is sometimes unable to receive write data for the disk drive 300 serially in the order of writing to successive areas of the logical block.

Transfer Flow of the Present Invention

According to the present invention, even in a case where the disk array device 200 is unable to receive write data for the logical block serially in the order of writing to successive areas of the logical block, the data controller 500 is able to add a security code in logical block units. This mechanism will be explained hereinbelow.

Figure 6:
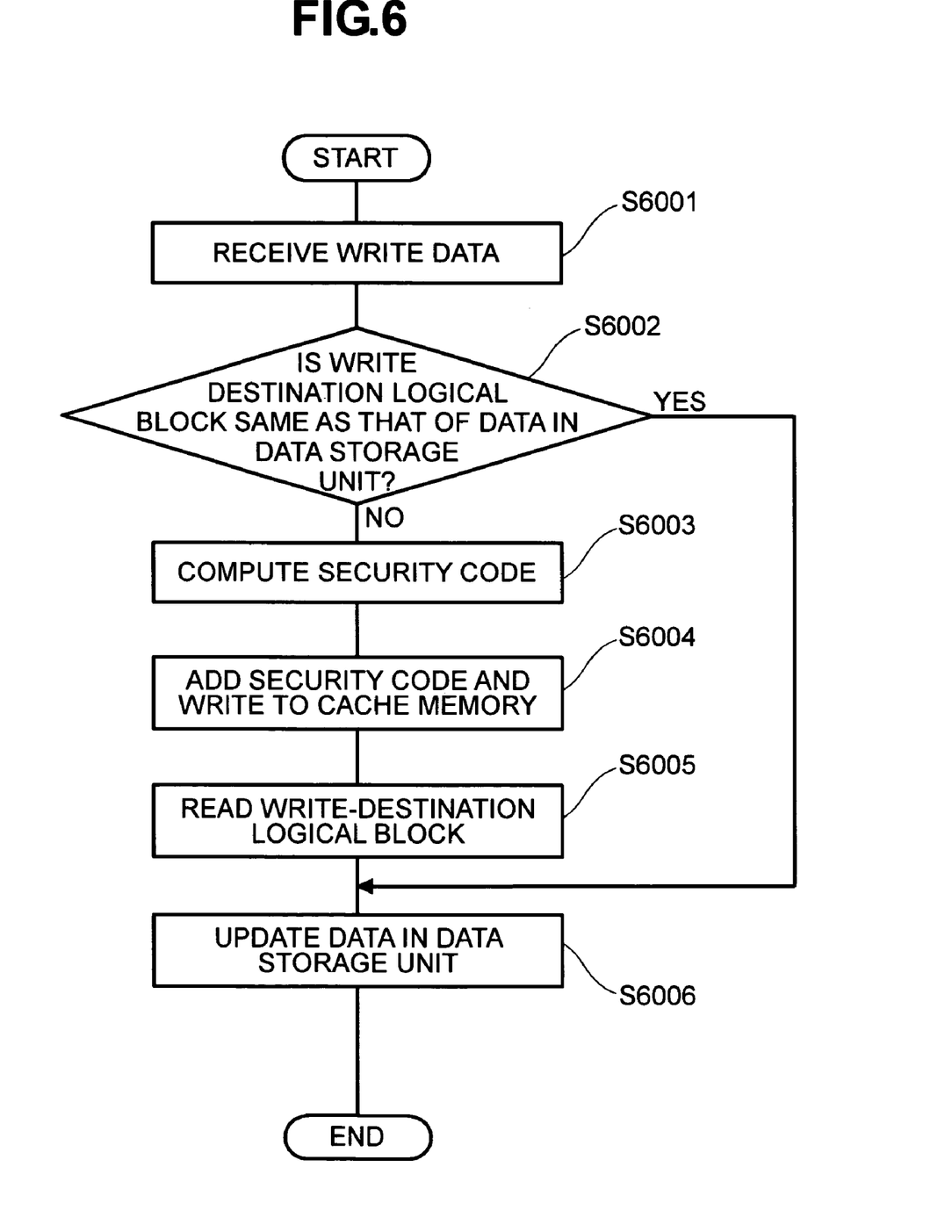
FIG. 6 is a flowchart that illustrates the flow of processing in which the data controller 500 receives write data from the FPC 204 and writes this write data to the cache memory 206, according to an embodiment of the present invention.

FIG. 6 is a flowchart that illustrates the flow of processing in which the data controller 500 receives write data from the FPC 204 and writes this write data to the cache memory 206.

The data controller 500 reads certain logical-block data from the cache memory 206 and stores this data in the data storage unit 504 beforehand.

The data controller 500 receives one-word data designated by an address in the disk drive 300 from the FPC 204 via the bus 207(S6001). The data controller 500 determines the logical block address constituting the write destination from the designated address and judges whether the write-destination logical block and the logical block stored in the data storage unit 504 are the same (S6002). When these logical blocks are different (S6002: NO), the data controller 500 performs a security code computation for the logical-block data that is stored in the data storage unit 504 (S6003). The data controller 500 adds the computed security code to the logical-block data stored in the data storage unit 504 before transferring this data to the cache memory 206 (S6004). The data controller 500 reads a logical block constituting the write destination of the received data from the cache memory 206 (S6005). The data controller 500 then updates the data stored in the data storage unit 504 according to the designated address (S6006).

When the logical block constituting the write destination of the write data received by the data controller 500 and the logical block of the data stored in the data storage unit 504 are the same (S6002:YES), the data controller 500 updates data stored in the data storage unit 504 without further processing (S6006).

Further, so that the data controller 500 reads the data of the logical block constituting the write target from the cache memory 206, the CPU 201 subjects the data in the cache memory 206 to staging from the disk drive 300 beforehand, for example. The timing for the staging can be determined on the basis of when the FPC 204 receives a block write request, when the data controller 500 receives the data of each word unit, or immediately before the processing of (S6005), for example.

Security Code Computation

The security code that the data controller 500 computes for the logical-block data is an LRC code that uses an XOR operation. The computation of the LRC code will be described with reference to FIGS. 7 and 8. In this embodiment, block data is stored in the data storage unit 504 and a security code is computed as shown in FIG. 8.

Figure 7:
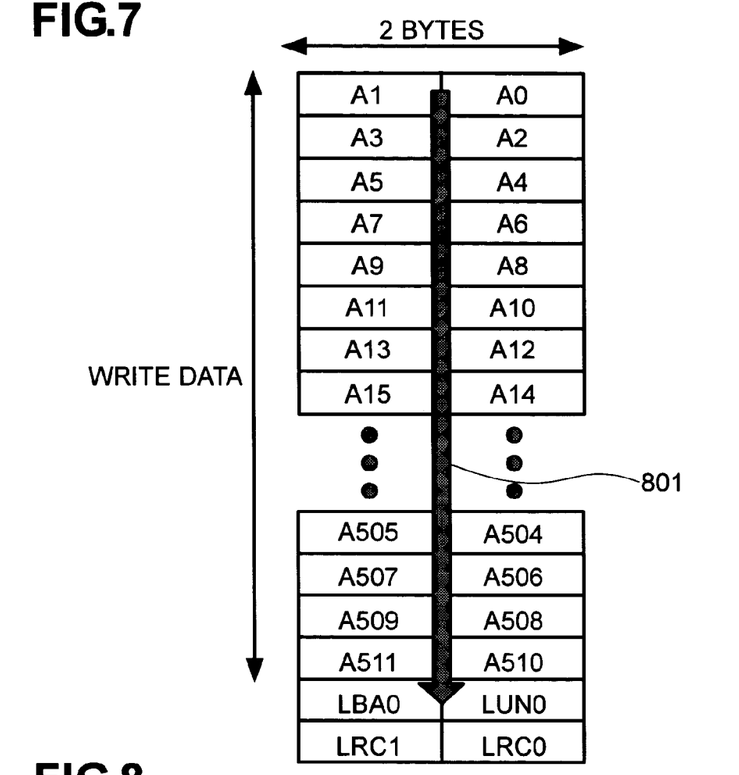
FIG. 7 is a diagram showing one block's worth of data that is stored in the data storage unit 504 that comprises the data controller 500 according to an embodiment of the present invention.
Figure 8:
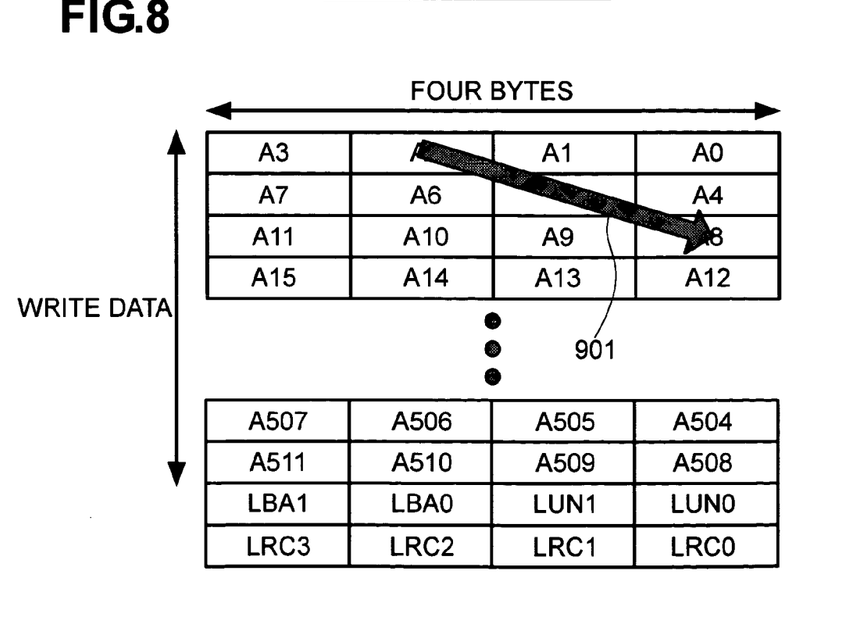
FIG. 8 is a diagram showing one block's worth of data that is stored in the data storage unit 504 that comprises the data controller 500 according to an embodiment of the present invention.

FIGS. 7 and 8 are diagrams showing one block's worth of data that is stored in the data storage unit 504 that the data controller 500 comprises. In FIG. 7, in the data storage unit 504, 512 bytes of data of one block are arranged in address order, two bytes at a time, and the lower eight bits (LBAO) of the logical block address and the lower eight bits of the logical unit number (LUN0) are added to the end of this data. In FIG. 8, in the data storage unit 504, 512 bytes of data of one block are arranged in address order, four bytes at a time, and the lower sixteen bits (LUN0 and LUN1) of the logical unit number and the lower sixteen bits (LBA0 and LBA1) of the logical block address are added to the end of this data. In this embodiment, the data shown in FIG. 8 is stored in the cache memory 206 and disk drive 300.

Before starting the LRC code computation, the data controller 500 sets '0' as the initial value of the computed LRC code. Accordingly, the values of LRC0 and LRC1 in FIG. 7 are '0' and each byte of LRC0 to LRC3 in FIG. 8 is '0'.

The data controller 500 performs an XOR operation on one block's worth of data stored in the data storage unit 504 in the computation direction 801 shown in FIG. 7 by using the LRC codes (LRC0 and LRC1) and the data, two bytes at a time, in the address order of the disk drive 300. A 16-bit LRC code (LRC0 and LRC1) is determined in FIG. 7 and written to the cache memory 206 as a 32-bit security code together with the LBA0 and LUN0.

Meanwhile, in the computation in the computation direction 901 shown in FIG. 8, the data controller 500 carries out an XOR operation on the above 4-byte unit data with respect to the LRC code. The data controller 500 stores the results of this computation as the LRC codes LRC0 to LRC3. Here, the data controller 500 performs the XOR operation after subjecting the $n^{th}$ 4-byte unit data to a cyclical shift ($8 \times n$) bits to the left. Accordingly, if the byte unit data shown in FIG. 8 is considered, for example, the value of LRC1 is determined as 'A2×A5× . . . ×A511×LBA0' according to the computation direction 901. Here, 'x' expresses the XOR operation.

Whereas the LRC code computed according to the computation direction 801 in FIG. 7 can be computed easily, the data order cannot be assured. For example, when the serial data reaches the data controller 500 in the wrong transmission order, even when data that was originally supposed to arrive second has been sent first, the computation result of the XOR operation is the same as the computation result in a case where data is received in the original order.

Therefore, as per the computation direction 901 shown in FIG. 8, the data controller 500 performs an XOR operation on the data stored in the data storage unit 504 while cyclically shifting this data. Hence, the problem of the result of the XOR operation being the correct security code when the data received from the FPC 204 is not correctly arranged in the designated address order is prevented.

Further, the unit for cyclically shifting every four bytes of data in an XOR operation is not limited to eight bits. An optional number of bits such as one bit, two bits, four bits, and so forth, may be shifted.

Further Embodiments

Although, in this embodiment, the data controller 500 adds a security code in write-data block units for the disk drive 300, this process could also be implemented by the FPC 204.

The FPC 204 comprises a data storage unit and reads one block's worth of data from the disk drive 300. The FPC 204 updates data of one block that is stored in the data storage unit that the FPC 204 comprises in accordance with the block write request received from the information processing device 100, and then computes a security code. The data controller 500 transfers block data, to which a security code has been added, to the cache memory 206. The data storage unit may be provided in the FPC 204 or the embodiment may be such that the FPC 204 uses a storage device such as the memory 202 that can be accessed by the FPC 204.

In addition, the addition of a security code to the data blocks may be performed by the CPU 201. The CPU 201 reads out logical-block data stored in the disk drive 300 to the memory 202. When the FPC 204 receives a block write request, the data controller 500 transfers the write data to the memory 202 and updates the logical-block data stored in the memory 202. The CPU 201 performs the computation of the security code with respect to the data of the logical block stored in the memory 202 and writes a security code at the end of the logical-block data stored in the memory 202. The data controller 500 transfers the logical-block data and security code stored in the memory 202 to the cache memory 206. Therefore, similarly to the data controller 500, the CPU 201 is able to compute the security code in block units.

In this embodiment, the LRC code is used for the security code. However, the CRC code, VRC code, Hamming code, a checksum, or parity, or the like, may be used for the security code instead of the LRC code.

This embodiment is such that the disk array device 200 stores write data for the disk drive 300 received by the FPC 204 in the cache memory 206 and transfers this write data from the cache memory 206 to the disk drive 300. However, the embodiment may be such that the FPC 204 writes the received data directly to the disk drive 300 via the FPC 205.

Second Embodiment

Figure 9:
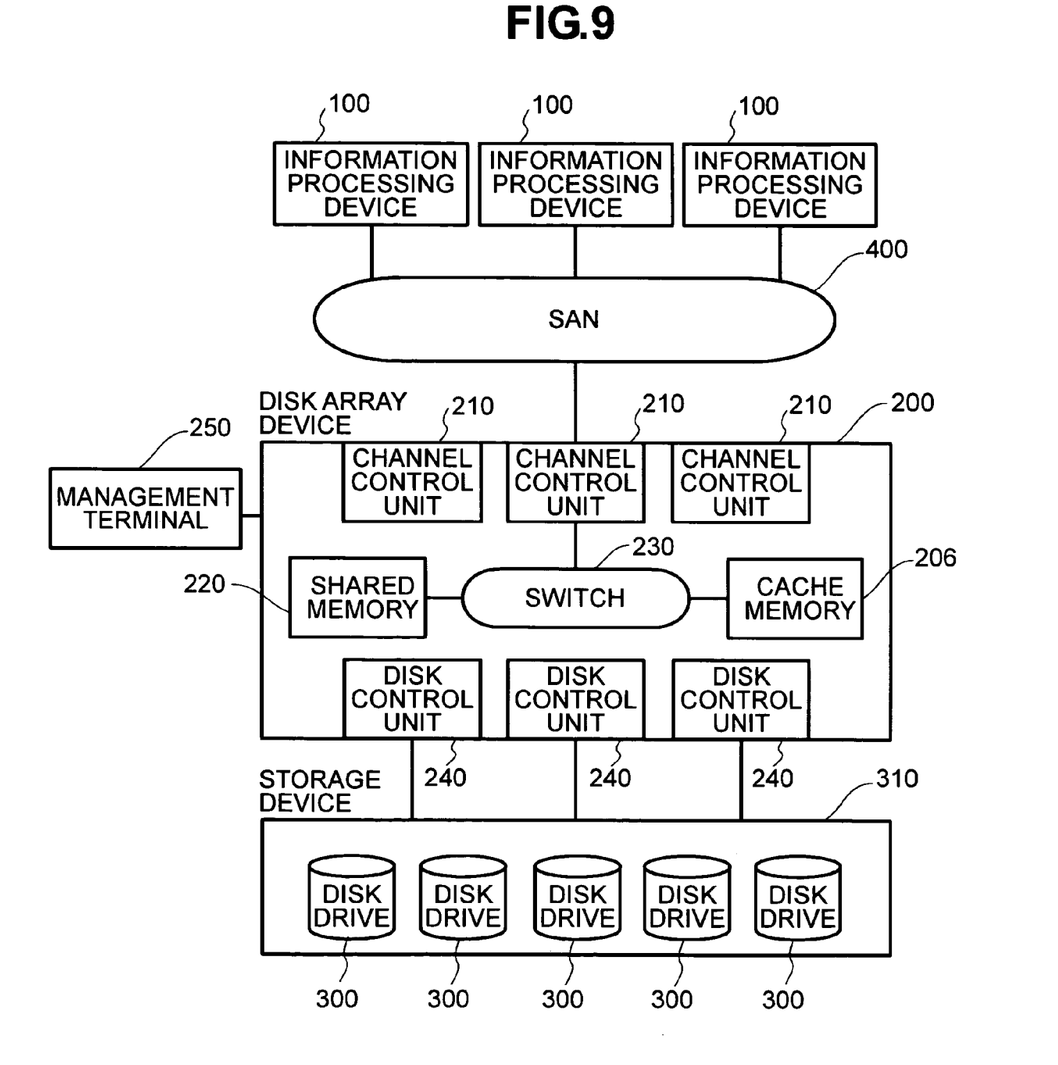
FIG. 9 is a block diagram showing the constitution of the information processing system according to an embodiment of the present invention.

Next, a description will be provided for a disk array device that represents one other embodiment of the present invention. FIG. 9 is a block diagram showing the constitution of the information processing system according to this second embodiment.

The information processing system shown in FIG. 9 has a constitution like that of the information processing system of the first embodiment. The disk array device 200 supplies the storage area of the disk drive 300 to the information processing device 100, and the information processing device 100 suitably transmits a block access request to the disk array device 200 and accesses the storage area of the disk drive 300. In this embodiment, the disk drive 300 is connected to the disk array device 200 as a storage device 310. The storage device 310 and the disk array device 200 may be connected via a communication channel in accordance with the SCSI protocol or Fibre Channel protocol. The storage device 310 and disk array device 200 may be directly connected or connected by means of a network connection. Further, the storage device 310 may be integrally incorporated into the disk array device 200.

As shown in FIG. 9, the disk array device 200 may comprise a channel control unit 210, shared memory 220, a switch 230, cache memory 206, a disk control unit 240, management terminal 250, and so forth.

The channel control unit 210 is connected to the SAN 400 and communicates with the information processing device 100. The channel control unit 210 comprises a communication interface and transmits a command (hereinafter called a 'disk control command'), which instructs a data input/output with respect to the disk drive 300 in accordance with a protocol, such as the LAN, SCSI, iSCSI, ESCON (registered trademark), FICON (registered trademark), ACONARC (registered trademark), or FIBARC (registered trademark) protocol, or the like, to the disk control unit 240, for example. Upon receiving the disk control command from the channel control unit 210, the disk control unit 240 performs control relating to data inputs/outputs with respect to the disk drive 300. The disk control command from the channel control unit 210 to the disk control unit 240 is transmitted via the shared memory 220. The shared memory 220 is shared by the channel control unit 210, the disk control unit 240, and the management terminal 250, and so forth.

The management terminal 250 is a computer for maintenance management of the disk array device 200. The management terminal 250 can be built into the disk array device 200, or it can be connected to the disk array device 200 as a separate computer terminal. The software and data updates and setting-information changes run by the channel control unit 210 and disk control unit 240, and so forth, are performed in accordance with instructions from the management terminal 250.

Channel Control Unit

Figure 10:
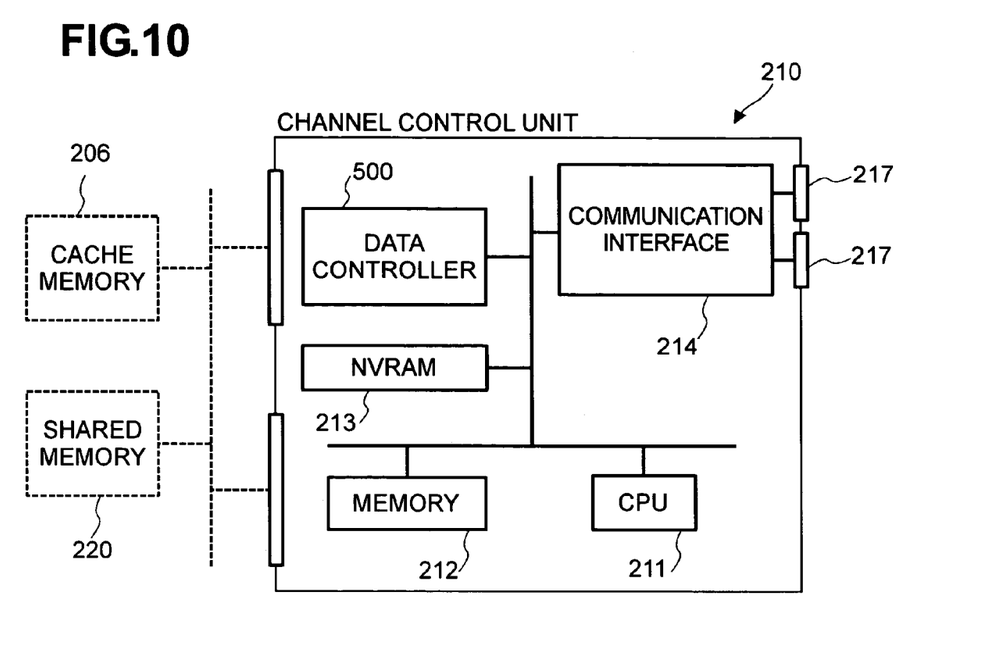
FIG. 10 is a block diagram showing the constitution of the channel control unit 210 according to an embodiment of the present invention.

FIG. 10 is a block diagram showing the constitution of the channel control unit 210. The channel control unit 210 is constituted by a circuit board formed as an integral unit. The channel control unit 210 comprises a CPU 211, memory 212, NVRAM 213, a communication interface 214, a data controller 500, and so forth, which are formed on a circuit board that is an integral unit.

The communication interface 214 comprises an interface for communicating with the information processing device 100. The communication connector 215 is a connector for communicating with the information processing device 100. In the case of the channel control unit 210 of this embodiment, the communication connector 215 is a connector that is capable of connecting to the SAN 400, and corresponds to a fibre channel, for example. If the channel control unit 210 receives a data I/O request, in which a file name is designated, from the information processing device 100, the communication connector corresponds to an Ethernet (trademark) connector and the channel control unit 210 receives a data I/O request via a LAN.

A connection connector 216 allows the channel control unit 210 to connect to the disk array device 200. Because the connection connector 216 mates with the connector of the disk array device 200, the circuit board of the channel control unit 210 is electrically connected to the disk array device 200. The channel control unit 210 is connected to the switch 230 via the connection connector 216 and is thus able to access the shared memory 220, cache memory 206, disk control unit 240, and so forth, in the disk array device 200.

The CPU 211 exercises overall control of the channel control unit 210. The CPU 211 implements a variety of functions by running application programs that are stored in the NVRAM 213 by reading these application programs to the memory 212. The NVRAM 213 is nonvolatile memory that stores various programs, setting data, and so forth. The content of application programs, set data, and so forth stored in the NVRAM 213 can be rewritten by means of an instruction from the management terminal 250.

The data controller 500, which was described with reference to the first embodiment, controls the data transfer within the channel control unit 210. The constitution of the data controller 500 is similar to the block constitution of parts shown in FIG. 2.

Upon receiving a block write request from the information processing device 100, the channel control unit 210 transmits data received by the communication interface 213 to the data controller 500 in word units under the control of the CPU 211. The data controller 500 writes data received from the communication interface 213 to the cache memory 206 similarly to the flow of the above-described processing shown in FIG. 6. A security code is added in logical-block units to the blocks of data written to the cache memory 206.

The write data written to the cache memory 206 is written to the disk drive 300 by the disk control unit 240. Accordingly, the security code is added in logical block units to the data written to the disk drive 300.

When the disk array device 200 receives a block access request for reading data from the information processing device 100, the channel control unit 210 generates a command instructing the disk control unit 240 to read data in accordance with this request, and it writes this command to the shared memory 220. The disk control unit 240 reads data in block units from the disk drive 300 in accordance with the command read from the shared memory 220 and writes this data to the cache memory 206. At such time, the data of the block unit thus read has a security code added to the end thereof and is written as such to the cache memory 206. The channel control unit 210 reads block-unit data from the cache memory 206 and tests the completeness of the data by using the security code thus added to the read data. The channel control unit 210 then sends block-unit data with the security code removed to the information processing device 100. Therefore, the disk array device 200 is able to provide highly reliable data storage services by reading data while suitably testing for data errors.

Disk Control Unit

Figure 11:
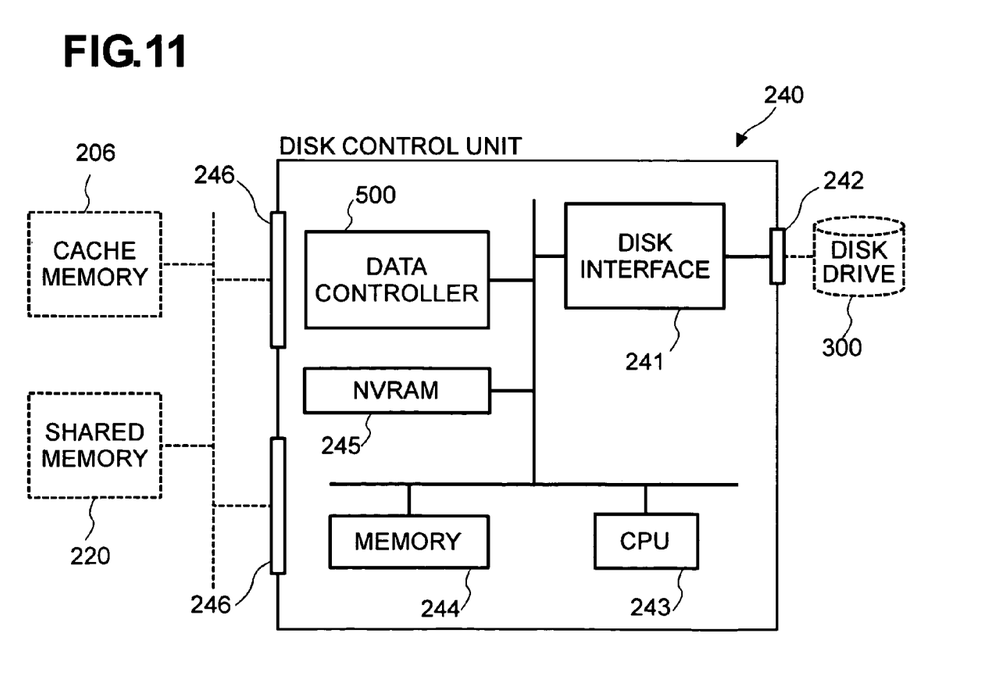
FIG. 11 is a block diagram showing the constitution of the disk control unit 240 according to an embodiment of the present invention.

The processing that adds a security code to the write data can also be undertaken by the disk control unit 240. FIG. 11 is a block diagram showing the constitution of the disk control unit 240. The disk control unit 240 is formed as a circuit board that is an integral unit. The circuit board of the disk control unit 240 comprises an interface 241, a CPU 242, a memory 243, an NVRAM 244, a connection connector 245, and a data controller 500, which are formed on a circuit board that is an integral unit.

The disk interface 241 comprises a communication interface for communicating with the disk drive 300. The connector 242 is a connector for communicating with the disk drive 300. In a case where the disk drive 300 is a SCSI hard disk, the connector 242 is a SCSI connector, for example. If the disk drive 300 is a hard disk complying with the Fibre Channel protocol, the connector 242 connects to a fibre channel.

The CPU 242 exercises overall control of the disk control unit 240 and performs communications between the channel control unit 210, disk drive 300, and management terminal 250. The functions of the disk control unit 240 according to this embodiment are implemented by running a variety of programs stored in the memory 243, NVRAM 244, and so forth. The functions implemented by the disk control unit 240 include control of the disk drive 300, RAID control, recovery management for the data stored in the disk drive 300, backup control, and remote-copy control, and so forth.

The NVRAM 244 is nonvolatile memory that stores a program that controls the CPU 242. The content of the program stored in the NVRAM 244 can be written or rewritten by means of instructions from the management terminal 250.

Because the connection connector 245 mates with the connector of the disk array device 200, the circuit board of the disk control unit 240 is electrically connected to the disk array device 200. The disk control unit 240 connects to the switch 230 via the circuit board-connection connector 216 and is able to access the shared memory 220, the cache memory 206, channel control unit 210, and so forth, in the disk array device 200.

The data controller 500 is similar to the data controller 500 described hereinabove. However, in the case of the data controller 500 that comprises the disk control unit 240, data that is read from the cache memory 206 is received data and block data to which a security code has been added is written to the disk drive 300.

The channel control unit 210 writes the received data to the cache memory 206 without adding a security code to this data. The disk control unit 240 treats the data read from the cache memory 206 as received data, and, in accordance with the flow of the processing shown in FIG. 6, computes a security code and writes data to the disk drive 300 rather than to the cache memory 206.

Further, the channel control unit 210 may receive write data for the disk drive 300 and update the data on the cache memory 206, and the disk control unit 240 may add a security code to this data. More specifically, when the channel control unit 210 receives write data for the disk drive 300 from the information processing device, the disk control unit 240 stages the data in the cache memory 206. The channel control unit 210 writes the received data to the cache memory 206 where necessary and thus updates the staged data. The disk control unit 240 reads the staged data from the cache memory 206 and writes this data to the disk drive 300 after computing a security code in block units.

As described above, with the disk array device 200 according to this embodiment, even when the write data, which is sent in series to the disk array device 200, does not reach the disk array device 200 in the order of writing to successive areas of a logical block, the disk array device 200 is able to add a security code in block units to the data stored in the disk drive 300. Therefore, a highly reliable data storage service can be provided.

An embodiment has been described above, but this embodiment is intended to facilitate comprehension of the present invention, not to provide a limited interpretation of the present invention without limiting the same. The present invention can be modified and improved without departing from the spirit thereof, and includes any equivalents.

What is claimed is:

1. A control method for a data transfer device that comprises a data receiver for receiving write data to be stored in a disk drive; a data control unit for transferring in block units the write data received by the data receiver to the disk drive; and data storage unit for temporarily storing serial data that is read from a storage area of the disk drive,
   wherein the method is performed by the data control unit and comprises the steps of:
   reading the serial data from the disk drive in block units and temporarily storing this serial data in block units in the data storage unit;
   comparing a logical block address of a write destination of the received write data with a logical block address of the serial data read from the disk drive and temporarily stored in the date storage unit;
   when the logical block address of the write destination of the received write data is the same as the logical block address of the serial data read from the disk drive and temporarily stored in the data storage unit compared therewith, updating the serial data temporarily stored in the data storage unit by means of the received write data so that the updated serial data is available to be compared to the next-received write data; and
   when the logical block address of the write destination of the received write data is different from the logical block address of the serial data read from the disk drive and temporarily stored in the data storage unit compared therewith, generating a security code based on the serial data temporarily stored in the data storage unit and according to the order of storage areas of the disk drive, adding the generated security code to the serial data temporarily stored in the data storage unit, transferring in block units this serial data having the security code added thereto to the disk drive, reading the serial data stored in the block in the disk drive constituting the write destination of the received write data, and updating the serial data thus read and stored in the data storage unit by means of the write data so that the updated serial data is available to be compared to the next-received write data.

2. The control method for the data transfer device according to claim 1, wherein serial write data that is serially received by the data receiver is not necessarily transferred to successive areas of the block in the order in which this data is received.

3. A data transfer circuit, comprising:
   a data receiver for receiving write data to be stored in a disk drive;
   a data control unit for transferring the write data received by the data receiver to the disk drive; and
   a data storage unit for temporarily storing serial data that is read from a storage area of the disk drive, wherein:

the data control unit reads the serial data from the disk drive in block units and temporarily stores this serial data in block units in the data storage unit, and compares logical block address of a write destination of the received write data with a logical block address of the serial data read from the disk drive and temporarily stored in the data storage unit;

when the logical block address of the write destination of the received write data is the same as the logical block address of the serial data read from the disk drive and temporarily stored in the data storage unit compared therewith, the data control unit updates the serial data temporarily stored in the data storage unit by means of the received write data so that the updated serial data is available to be compared to the next-received write data; and when the logical block address of the write destination of the received write data is different from the logical block address of the serial data read from the disk drive and temporarily stored in the data storage unit compared therewith, the data control unit generates a security code based on the serial data temporarily stored in the data storage unit and according to the order of storage areas of the disk drive, adds the generated security code to the serial data temporarily stored in the data storage unit, transfers in block units this serial data having the security code added thereto to the disk drive, reads the serial data stored in the block in the disk drive constituting the write destination of the received write data, and updates the serial data thus read and stored in the data storage unit by means of the write data so that the updated serial data is available to be compared to the next-received write data.

4. The data transfer circuit according to claim 3, wherein serial write data that is serially received by the data receiver is not necessarily transferred to successive areas of the block in the order in which this data is received.

5. A disk array device, comprising:

a host interface for receiving write data to be stored in a disk drive from an information processing device; and a data controller that transfers in block units the write data received by the host interface to the disk drive, wherein:

the data controller comprises a data receiver for receiving write data to be stored in the disk drive from the host interface; a data control unit for transferring in block units the write data received by the data receiver to the disk drive; and data storage unit for temporarily storing serial data read from a storage area of the disk drive;

the data control unit reads the serial data from the disk drive in block units and then stores this serial data in the data storage unit;

the data control unit compares a logical block address of a write destination of the received write data with a logical block address of the serial data read from the disk drive and temporarily stored in the data storage unit;

when the logical block address of the write destination of the received write data is the same as the logical block address of the serial data read from the disk drive and temporarily stored in the disk storage unit, the data control unit updates the serial data temporarily stored in the data storage unit by means of the write data so that the updated serial data is available to be compared to the next-received write data; and when the logical block address of the write destination of the received write data is different from the logical block address of the serial data read from the disk drive and temporarily stored in the data storage unit, the data control unit generates a security code based on the serial data temporarily stored in the data storage unit and according to the order of storage areas of the disk drive, adds the generated security code to the serial data temporarily stored in the data storage unit, transfers in block units this serial data having the security code added thereto to the disk drive, reads the serial data stored in the block in the disk drive constituting the write destination of the received write data, and updates the serial data temporarily stored in the data storage unit by means of the write data so that the updated serial data is available to be compared to the next-received write data.

6. The disk array device according to claim 5, wherein the host interface is connected to the information processing device via a network; and serial write data that is serially received by the host interface is not necessarily transferred to successive areas of the block in the order in which this data is received.

7. A disk array device, comprising:

a host interface for receiving write data to be stored in a disk drive from an information processing device;

a data controller that transfers in block units the write data received by the host interface to the disk drive;

a processor for exercising overall control; and memory for storing data, wherein:

the processor reads serial data from the disk drive in block units and temporarily stores this serial data in the memory;

the processor compares a logical block address of a write destination of the received write data with a logical block address of the serial data read from the disk drive and temporarily stored in the memory;

when the logical block address of the write destination of the received write data is the same as the logical block address of the serial data read from the disk drive and temporarily stored in the memory, the processor updates the serial data temporarily stored in the memory by means of the received write data so that the updated serial data is available to be compared to the next-received write data; and when the logical block address of the write destination of the received write data is different from the logical block address of the serial data read from the disk drive and temporarily stored in the memory, the processor generates a security code based on the serial data temporarily stored in the memory and according to the order of storage areas of the disk drive, adds the generated security code to the serial data temporarily stored in the memory, transfers in block units this data having the security code added thereto to the disk drive, reads the serial data stored in the block of the disk drive constituting the write destination of the received write data, and updates the serial data thus read and stored in the memory by means of the write data so that the updated serial data is available to be compared to the next-received write data.

8. A disk array device, comprising:

a channel control unit for receiving write data to be stored in a disk drive from an information processing device;

a disk control unit that performs processing relating to the writing of data to the disk drive; and a cache memory for storing data that is exchanged between the channel control unit and the disk control unit, wherein:

the channel control unit comprises a data receiver for receiving the write data;

a data control unit for transferring in block units the write data received by the data receiver to the cache memory; and a data storage unit for storing serial data received from a storage area of the disk drive;

the disk control unit reads serial data stored In the disk drive in block units from the cache memory and then temporarily stores this serial data in the data storage unit;

the disk control unit compares a logical block address of a write destination of the received write data with a logical block address of the serial data read from the cache memory and temporarily stored in the data storage unit;

when the logical block address of the write destination of the received write data is the same as the logical block address of the serial data read from the disk drive and temporarily stored in the data storage unit, the data control unit updates the serial data temporarily stored in the data storage unit by means of the received write data so that the updated serial data is available to be compared to the next-received write data; and when the logical block address of the write destination of the received write data is different from the logical block address of the serial data read from the disk drive and temporarily stored in the data storage unit, the data control unit generates a security code based on the serial data temporarily stored in the data storage unit and according to the order of storage areas of the disk drive, adds the generated security code to the serial data temporarily stored in the data storage unit, transfers in block units this serial data having the security code added thereto to the cache memory, reads the serial data stored in the block of the disk drive constituting the write destination of the received write data from the cache memory, and updates the data thus read and stored in the data storage unit by means of the write data so that the updated serial data is available to be compared to the next-received write data.

9. The disk army device according to claim 8, wherein the channel control unit comprises an interface, which is connected to the information processing device via a network and receives the write data;

the data receiver receives the write data from the interface; and serial write data that is serially received by the interface is not necessarily transferred to successive areas of the block in the order in which this data is received.

10. A disk array device, comprising:

a channel control unit for receiving write data to be stored in a disk drive from an information processing device;

a disk control unit that performs processing relating to the writing of data to the disk drive; and a cache memory for storing data that is exchanged between the channel control unit and the disk control unit, wherein:

the disk control unit comprises a data read unit, which reads the write data from the cache memory, a data control unit which transfers in block units the write data read by the data read unit to the disk drive; and a data storage unit for storing serial data received from a storage area of the disk drive;

the disk control unit reads the serial data from the disk drive in block units and then temporarily stores this serial data in the data storage unit;

the disk control unit compares a logical block address of a write destination of the received write data with a logical block address of the serial data read from the disk drive and temporarily stored in the data storage unit;

when the logical block address of the write destination of the received write data is the same as the logical block address of the serial data read from the disk drive and temporarily stored in the data storage unit, the data control unit updates the serial data temporarily stored in the data storage unit by means of the write data read from the cache memory so that the updated serial data is available to be compared to the next-received write data; and when the logical block address of the write destination of the received write data is different from the logical block address of the serial data read from disk drive and temporarily stored in the data storage unit, the data control unit generates a security code based on the serial data temporarily stored in the data storage unit and according to the order of the storage areas of the disk drive, adds the generated security code to the serial data temporarily stored in the data storage unit before transferring in block units this serial data having the security code added thereto to the disk drive, reads the serial data stored in the block of the disk drive constituting the write destination of the received write data, and updates the data thus read and stored in the data storage unit by means of the write data so that the updated serial data is available to be compared to the next-received write data.

11. A control method for a data transfer device that comprises a data receiver for receiving write data to be stored in a disk drive; a data control unit for transferring in block units the write data received by the data receiver to the disk drive; and a data storage unit for temporarily storing serial data that is read from a storage area of the disk drive, wherein the method is performed by the data control unit and comprises the steps of:

reading the serial data from the disk drive in block units and temporarily storing this serial data in block units in the data storage unit;

comparing a logical block address of a write destination of the received write data with a logical block address of the serial data read from the disk drive and temporarily stored in the data storage unit;

when the logical block address of the write destination of the received write data is the same as the logical block address of the serial data read from the disk drive and temporarily stored in the data storage unit, updating the serial data temporarily stored in the data storage unit by means of the received write data, and transferring the updated serial data to the disk drive; and when the logical block address of the write destination of the received write data is different from the logical block address of the serial data read from the disk drive and temporarily stored in the data storage unit, generating a security code based on the serial data stored in the data storage unit and according to the order of storage areas of the disk drive, adding the generated security code to the serial data temporarily stored in the data storage unit, transferring in blocks units this serial data having the security code added thereto to the disk drive, reading the serial data stored in the block of the disk drive constituting the write destination of the received write data, and updating the data thus read and stored in the data storage unit by means of the write data so that the updated serial data is available to be compared to the next-received write data.

12. The control method for the data transfer device according to claim 11, wherein serial write data that is serially received by the data receiver is not necessarily transferred to successive areas of the block in the order in which this data is received.

* * * * *